(12) United States Patent
Ashkar et al.

(10) Patent No.: US 11,144,329 B2
(45) Date of Patent: Oct. 12, 2021

(54) PROCESSOR MICROCODE WITH EMBEDDED JUMP TABLE

(71) Applicant: ADVANCED MICRO DEVICES, INC., Santa Clara, CA (US)

(72) Inventors: Alexander Fuad Ashkar, Orlando, FL (US); Rakan Khraisha, Orlando, FL (US); Rex Eldon McCrary, Orlando, FL (US); Harry J. Wise, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 115 days.

(21) Appl. No.: 16/427,407

(22) Filed: May 31, 2019

(65) Prior Publication Data

US 2020/0379792 A1 Dec. 3, 2020

(51) Int. Cl.
*G06F 9/445* (2018.01)
*G06F 9/44* (2018.01)
*G06F 9/455* (2018.01)
*G06F 9/48* (2006.01)
*G06F 9/50* (2006.01)
*G06F 9/30* (2018.01)

(52) U.S. Cl.
CPC ............... *G06F 9/445* (2013.01); *G06F 9/30* (2013.01); *G06F 9/30003* (2013.01); *G06F 9/3005* (2013.01); *G06F 9/30098* (2013.01); *G06F 9/44* (2013.01); *G06F 9/455* (2013.01); *G06F 9/45533* (2013.01); *G06F 9/45558* (2013.01); *G06F 9/48* (2013.01); *G06F 9/50* (2013.01); *G06F 9/5005* (2013.01); *G06F 2009/45575* (2013.01); *G06F 2009/45583* (2013.01); *G06F 2009/45587* (2013.01)

(58) Field of Classification Search
CPC . G06F 9/44; G06F 9/445; G06F 9/455; G06F 9/45533; G06F 9/45558; G06F 2009/45575; G06F 2009/45583; G06F 2009/45587; G06F 9/48; G06F 9/50; G06F 9/5005; G06F 9/30; G06F 9/30003; G06F 9/3005; G06F 9/30098
See application file for complete search history.

(56) References Cited

U.S. PATENT DOCUMENTS

| 2004/0153302 A1* | 8/2004 | Mukund | ................. G06F 30/33 703/14 |
| 2009/0100250 A1* | 4/2009 | Chen | ................... G06F 9/45554 712/43 |

(Continued)

*Primary Examiner* — Charles M Swift

(57) ABSTRACT

A processing unit employs microcode wherein the jump table associated with the microcode is embedded in the microcode itself. When the microcode is compiled based on a set of programmer instructions, the compiler prepares the jump table for the microcode and stores the jump table in the same file or other storage unit as the microcode. When the processing unit is initialized to execute a program, such as an operating system, the processing unit retrieves the microcode corresponding to the program from memory, stores the microcode in a cache or other memory module for execution, and automatically loads the embedded jump table from the microcode to a specified set of jump table registers, thereby preparing the processing unit to process received packets.

20 Claims, 4 Drawing Sheets

(56) References Cited

U.S. PATENT DOCUMENTS

| | | | |
|---|---|---|---|
| 2013/0031294 A1* | 1/2013 | Feng | H04L 12/00 |
| | | | 711/6 |
| 2013/0174144 A1* | 7/2013 | Cheng | G06T 1/20 |
| | | | 718/1 |
| 2017/0235511 A1* | 8/2017 | Palmer | G06F 3/067 |
| | | | 711/154 |
| 2018/0219776 A1* | 8/2018 | Yu | H04L 69/22 |

\* cited by examiner

PROCESSOR MICROCODE WITH EMBEDDED JUMP TABLE

BACKGROUND

To facilitate efficient operation, some processing units of a processor are configured to process packets received from another processing unit. For example, a graphics processing unit (GPU) sometime includes a command processor (CP) that supports processing of packets received from a central processing unit (CPU) of the processor. Each packet includes an op code indicating the one or more GPU operations requested by the packet. To facilitate packet processing, the CP employs two structures: a set of microcode and a jump table. The microcode includes sequences of commands to be executed by the command processor, while the jump table indicates, for each op code, where in the microcode the CP is to begin executing commands. Thus, each op code indicates the sequence of commands in the microcode that are to be executed. For each received packet, the CP hardware automatically interprets the op code of the packet, performs a lookup of the jump table to identify an entry corresponding to the op code, and sets an instruction pointer (IP) based on the identified entry. The CP then executes a sequence of microcode commands, beginning with the command indicated by the instruction pointer.

In many cases, the microcode and corresponding jump table differs between programs being executed by the processor. For example, in virtualized computing environments wherein the processor executes different virtual machines (VMs), each VM is likely to have different microcode or a different jump table, or both. Accordingly, when preparing to execute a program, the CPU initializes the GPU by loading the corresponding microcode to an internal memory and the jump table to a specified set of registers. However, conventional initialization techniques are relatively inefficient in scenarios such as virtualized computing environments wherein the processor is frequently switching between executing programs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for employing microcode at a processing unit wherein the jump table associated with the microcode is embedded in the microcode itself. For example, in some embodiments when the microcode is compiled based on a set of programmer instructions, the compiler prepares the jump table for the microcode and stores the jump table in the same file or other storage unit as the microcode. When a processing unit of a processor is initialized to execute a program, such as an operating system, the processing unit retrieves the microcode corresponding to the program from memory, stores the microcode in a cache or other memory module for execution, and automatically loads the embedded jump table from the microcode to a specified set of jump table registers, thereby preparing the processing unit to process received packets.

In some embodiments, by employing sets of microcode with embedded jump tables, the processor addresses several limitations of conventional microcode approaches. In particular, in a conventional processor, the microcode and corresponding jump table are stored separately, and are loaded separately to memory and the jump table registers, respectively, by a device driver. This approach requires the device driver to issue separate sets of loading commands to the processing unit for the microcode and jump table. In scenarios where the processing is frequently switching between programs, such as in virtualized computing environments where the processor frequently switches between virtual machines, the separate sets of loading commands are repeatedly executed, thereby impacting processing efficiency. In contrast, by embedding the jump table with the microcode, the processor is able to load both the jump table and the microcode to the processing unit in response to a single initialization request for a given program, thereby improving processing efficiency.

Further, storing the jump table and microcode separately sometimes leads to errors such as accidental mismatches between the jump table and microcode, such as when a programmer updates a set of microcode but forgets to update the corresponding jump table. Such mismatches cause incorrect or failed execution of the corresponding program. Using the techniques described herein, the jump table is embedded with the microcode during compilation, thereby preventing mismatches between the microcode and the jump table.

In addition, embedding microcode with the jump table supports enhanced processor and program security. For example, in some embodiments the microcode and embedded jump table are loaded from protected regions of memory, or via a private processor bus, or both, that are inaccessible from external access. This approach prevents a hypervisor from accidentally, or maliciously, accessing program data via modification of the jump table during the initialization of the processing unit, thus enhancing processor security.

Figure 1:
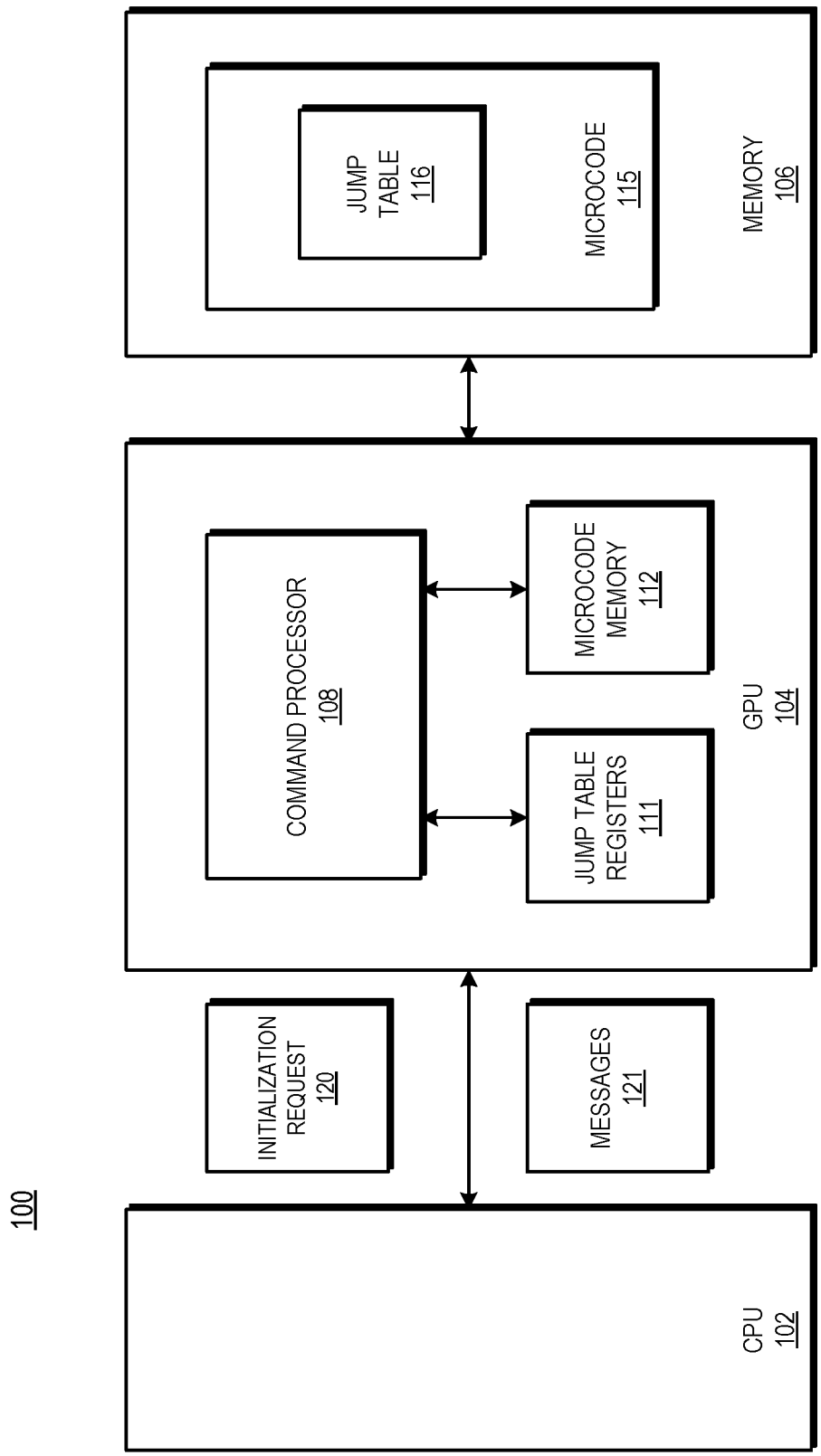
FIG. 1 is a block diagram of a processor including a processing unit that employs microcode with an embedded jump table in accordance with some embodiments.

Turning to the figures, FIG. 1 illustrates a processor 100 in accordance with some embodiments. The processor 100 is generally configured to execute sets of instructions in order to perform operations on behalf of an electronic device. Accordingly, in different embodiments the processor 100 is part of an electronic device such as a desktop or laptop computer, a server, a game console, a smartphone or other handheld electronic device, a tablet, and the like.

To support execution of instructions, the processor 100 includes a CPU 102, a GPU 104, and a memory 108. The memory 108 includes one or more memory modules configured to store data on behalf of the CPU 102 and the GPU 104. In some embodiments, the memory 108 represents a memory hierarchy for the processor 102 and includes one or more caches at different levels of the memory hierarchy, as well as a system memory at a highest level of the memory hierarchy. In some embodiments, the system memory is external to the processor 100.

The CPU 102 includes one or more processor cores (not shown), with each processor core including one or more instruction pipelines. Each instruction pipeline includes a fetch stage to fetch instructions of an executing program, a decode stage to decode each instruction into one or more operations, execution units to execute the operations, and a retire stage to retire executed instructions.

The GPU 104 is a processing unit generally configured to perform operations associated with graphics and vector processing. Accordingly, in some embodiments the GPU 104 includes a plurality of compute units (not shown at FIG. 1) that are generally configured to concurrently execute sets of graphics and vector operations on behalf of the processor 100. To support enhanced processing efficiency, the CPU 102 is configured to initiate and control the graphics and vector operations by generating and providing packets (e.g. packets 121) to the CPU 104. Each packet includes an op code indicating the requested operation, as well as any additional information associated with the requested operation, such as a designation of the data upon which the operation is to be performed.

To process the received packets, the GPU 104 employs a command processor 108, jump table registers 111 and microcode memory 104. The command processor 108 is generally configured to identify the op code for each packet, to identify a sequence of microcode commands associated with the op code, as described further herein, and to execute the identified sequence of microcode commands. By executing the sequence of microcode commands, the CP 108 performs operations such as initiating or modifying execution of wavefronts, configuring one or more aspects of the GPU 104, generating return packets for the CPU 102, and the like.

To identify and execute the sequence of microcode commands, the CP 108 employs the jump table registers 111 and microcode memory 112. To illustrate, in response to executing a specified program (e.g. an operating system or virtual machine) the CPU 102 sends an initialization request 120 to the GPU 104. In some embodiments, the initialization request 120 indicates the region of the memory 108 where microcode (e.g., microcode 115) is stored. In response to the initialization request, the command processor 108 retrieves the microcode 115 from the indicated region of the memory 108 and transfers the microcode 115 to the microcode memory 112. In addition, the command processor 108 loads a jump table 116 associated with microcode 115 to the jump table registers 111.

After loading the microcode 115 and the jump table 116, in response to receiving a packet from the CPU 102, the command processor 108 decodes the packet to identify the packet's op code. The CP 108 then accesses the jump table 116 at the jump table registers 111 to identify an index corresponding to the op code. The CP 108 sets a program counter (not shown) to a value based on the index and accesses the microcode memory based on the value of the program counter. The CP 108 then executes the microcode command sequence beginning with accessed entry.

In the depicted example, the jump table 116 is embedded within the microcode 115. For example, in some embodiments, the microcode 115 is stored in a file generated by a compiler for the program that employs the microcode, and the jump table 116 is embedded in the same file with the microcode 115. The complier will embed the jump table programming as part of the initialization routine, by issuing a set of instructions to the private bus to program the internal jump table. The technique used is unique in that the source program itself embeds the jump table to support the same program. Accordingly, during initialization, the CP 108 transfers the microcode 115 and the jump table 116 from the same file stored at the memory 108.

Figure 2:
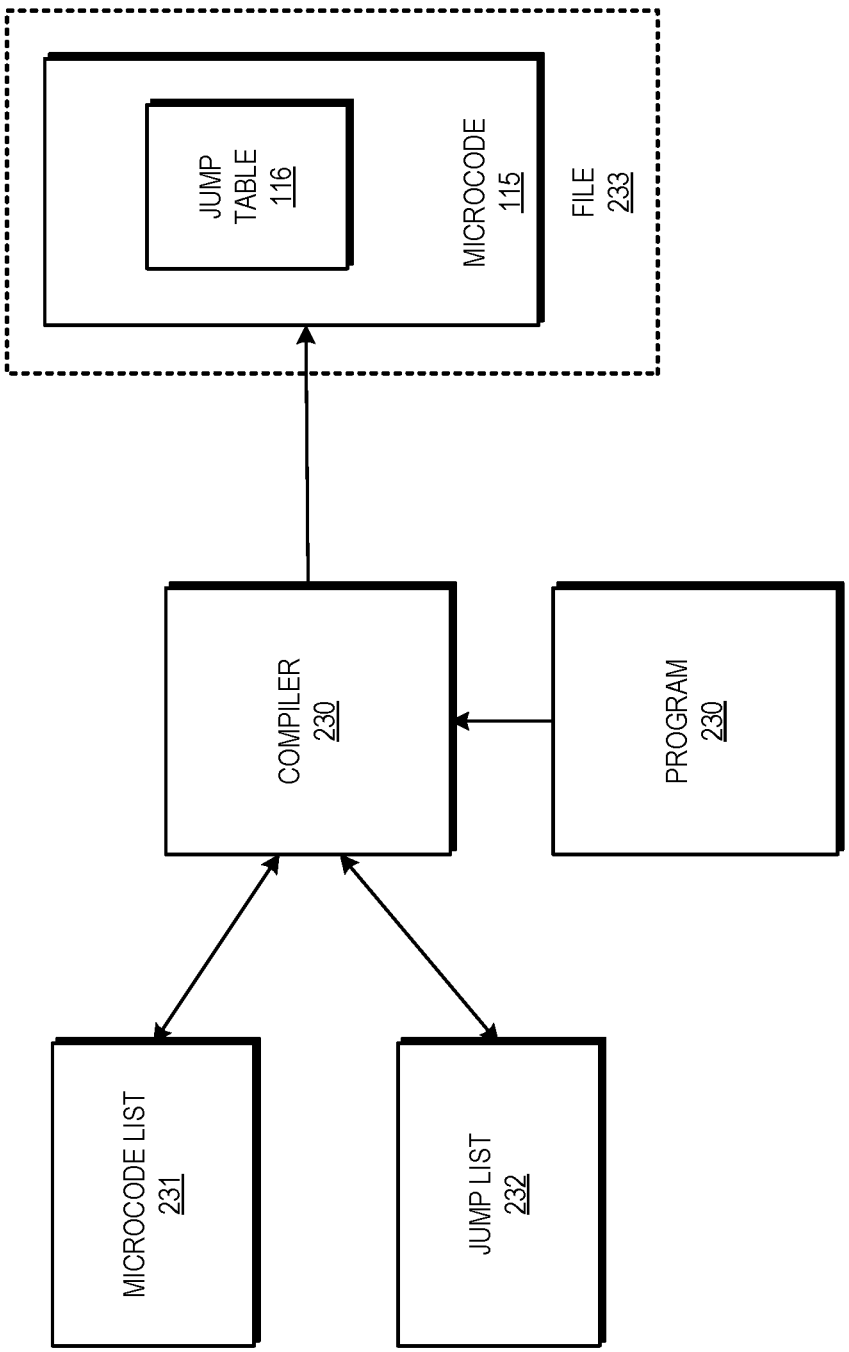
FIG. 2 is a block diagram illustrating a compiler embedding a jump table with the microcode of FIG. 1 in accordance with some embodiments.

FIG. 2 illustrates an example of a compiler 230 compiling microcode and a corresponding jump table in accordance with some embodiments. In the depicted example, a programmer has prepared a program 230 using a software development kit or other development tool. In different embodiments, the program is an operating system, a virtual machine program, a device driver for the GPU 104, and the like, or a combination thereof. The compiler 230 is generally configured to translate, or compile, the program 230 into a set of instructions that are executable by the processor 100. During compilation, the compiler 230 analyzes the program 230 to determine the operations to be performed by the GPU 104 and, based on those operations, prepares a microcode list 231, wherein the microcode list 231 indicates the op code for each operation and the sequence of microcode commands associated with the op code that, when executed, carry out the operation.

In addition, the compiler 230 prepares a jump list 232, indicating the address offsets associated with each op code. Each address offset indicates the location in the microcode list 231 where the corresponding sequence of microcode commands for the op code begins. Based on the microcode list 231 and the jump list 232, the compiler 233 generates a file 233 to include the microcode 115 and embeds the jump table 116 (reflecting the jump list 116) in the microcode 115. The processor 100 stores the file 233 at the memory 106 for loading to the GPU 104, as described above.

Figure 3:
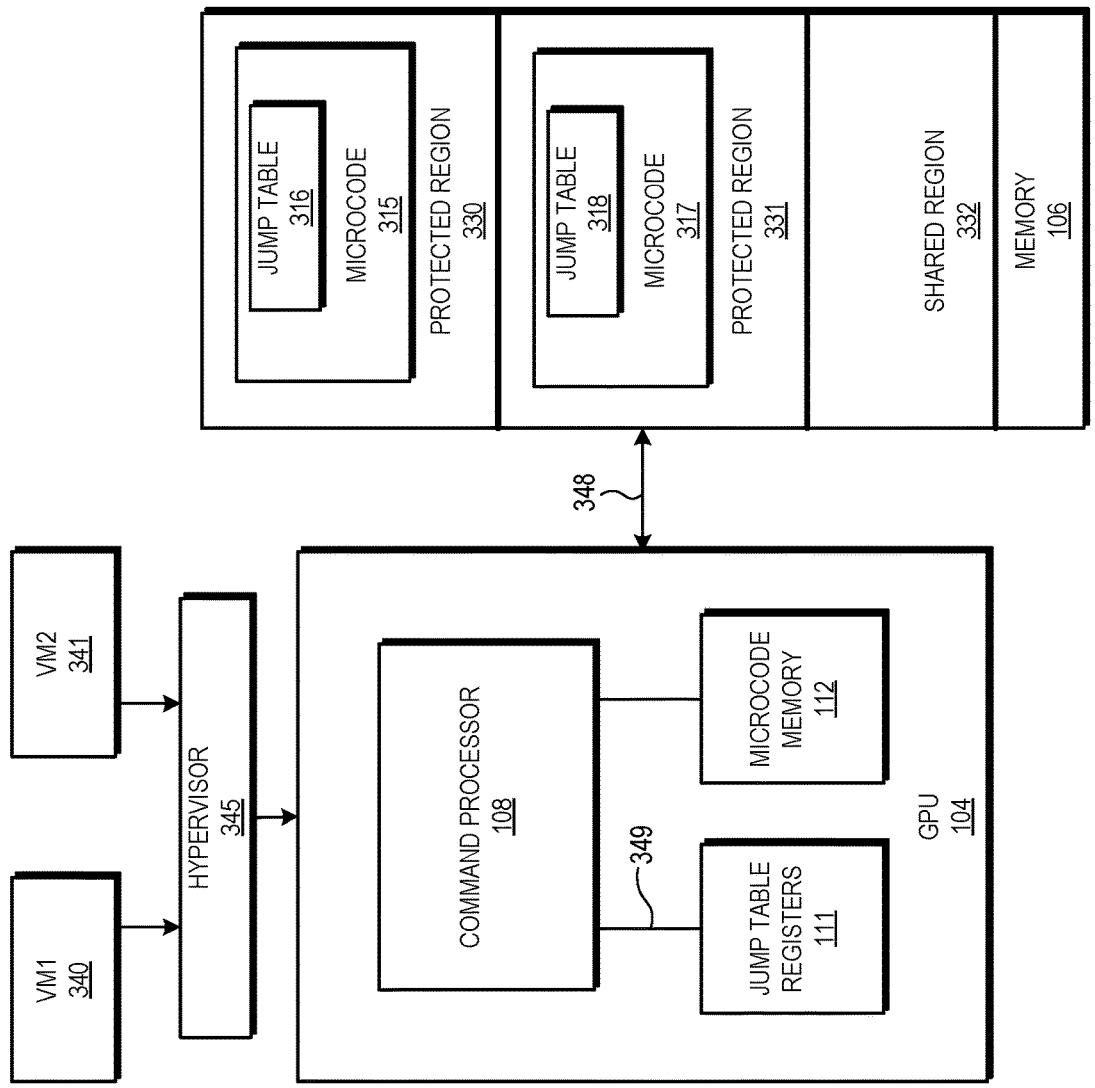
FIG. 3 is a block diagram illustrating an example of the processor of FIG. 1 employing different microcode, with different embedded jump tables, when implementing a virtualized computing environment in accordance with some embodiments.

As indicated above, by embedding a jump table within microcode, switching between programs at the processor 100 is simplified. An example is illustrated at FIG. 3 in accordance with some embodiments, wherein the processor 100 implements a virtualized computing environment. In particular, the processor 100 concurrently executes multiple virtual machines, designated VM 340 and VM 341. A hypervisor 345 manages execution of the VMs 340 and 341. In different embodiments, the hypervisor 345 is a hardware module, software executing at the CPU 102, or a combination thereof. The hypervisor 345 supports concurrent execution of the VMs 340 and 341 by time-multiplexing the VM execution. That is, at specified points in time (e.g., every N clock cycles of the CPU 102), in response to specified events (e.g. a VM entering an idle period) or a combination thereof, the hypervisor 345 executes a world switch by saving the state of the VM currently being executed at the processor 100, initializing the processor 100 to execute another VM, and executing the initialized VM until the next world switch.

In response to each world switch the hypervisor 345 sends an initialization request to the GPU 104 indicating the VM that is to be executed. In response, the CP 108 accesses the memory 106 to load microcode and a corresponding jump table for the VM. To illustrate, the memory 106 stores different microcode for the VMs 340 and 341, designated microcode 315 and 317, respectively. Each of the microcode 315 and 317 includes a corresponding embedded jump table, designated jump table 316 and 318, respectively. Thus, in response to an initialization request from the hypervisor 345 for the VM 340, the CP 108 loads the microcode 315 to the microcode memory 112 and the embedded jump table 316 to the jump table registers 111. In response to a world switch from the VM 340 to the VM 341, the hypervisor 345 sends an initialization request for the VM 341 to the CP 108. In response, the CP 108 loads the microcode 317 to the microcode memory 112 and the embedded jump table 318 to the jump table registers 111.

It will be appreciated that the CP 108 is configured to load both microcode and corresponding embedded jump table automatically in response to an initialization request. That is, in response to the initialization request, the CP 108 automatically generates and communicates the memory access requests and other commands to transfer the microcode to the microcode memory 112 and the corresponding jump table to the jump table registers 111. In contrast, conventional processors typically require a hypervisor to separately load the microcode and jump table, using separate sets of issued commands. Accordingly, by employing an embedded jump table as described herein, the number of commands to GPU 104 the CP 108 for each world switch is reduced, improving processing efficiency.

In addition, embedding microcode with the jump table supports enhanced processor and program security. For example, in the depicted embodiment each of the VMs 340 and 341 are assigned a corresponding protected region of the memory 106, designated protected region 330 and protected region 331, respectively. The memory 106 also includes a shared region 332 that is accessible by the hypervisor 345 and by either VM. In some embodiments, a memory controller (not shown) enforces the privacy of each protected region by executing only memory access requests targeted to a protected region that are generated by the corresponding VM. For example, the memory controller allows memory access requests targeting the protected region 330 only if those requests are generated by the VM 340. In addition, each protected region is accessible by the CP 108 in response to an initialization request to load the corresponding microcode and embedded jump table. However, the protected region for a VM is inaccessible for the hypervisor 345 and any other hardware or software (e.g. a device driver) that is not part of the corresponding VM. The microcode and jump table therefore cannot be accessed accidentally or maliciously by the hypervisor 345 or other software or hardware, enhancing VM security. In contrast, in a conventional processor the hypervisor, device driver, or other entity is able to access at least the jump table of a set of microcode so that the entity is able to load the jump table to the jump table registers. This conventional approach exposes the jump table to modification by a malicious entity, potentially exposing private information of a VM to unauthorized access. By embedding the jump table with the microcode, the likelihood of unauthorized access to the jump table, and to the corresponding VM, is reduced.

In addition, in some embodiments, the security of the jump table is enhanced by restricting access to the interconnect between the GPU 104 and the memory 106 (designated interconnect 348) and to the interconnect between the CP 108 and the jump table registers 111 (designated interconnect 349). The interconnects 348 and 349 are inaccessible to the CPU 102 and to the hypervisor 345. That is, neither the CPU 102 nor the hypervisor 345 is able to read or write data on either of the interconnects 348 or 349. The CPU 102 and the hypervisor 104 are thus prevented from modifying a jump table as it is stored at, or being loaded to, the jump table registers 111. The processor 100 thereby reduces the likelihood that a malicious program is able to modify a jump table of a VM, thus enhancing VM security.

Figure 4:
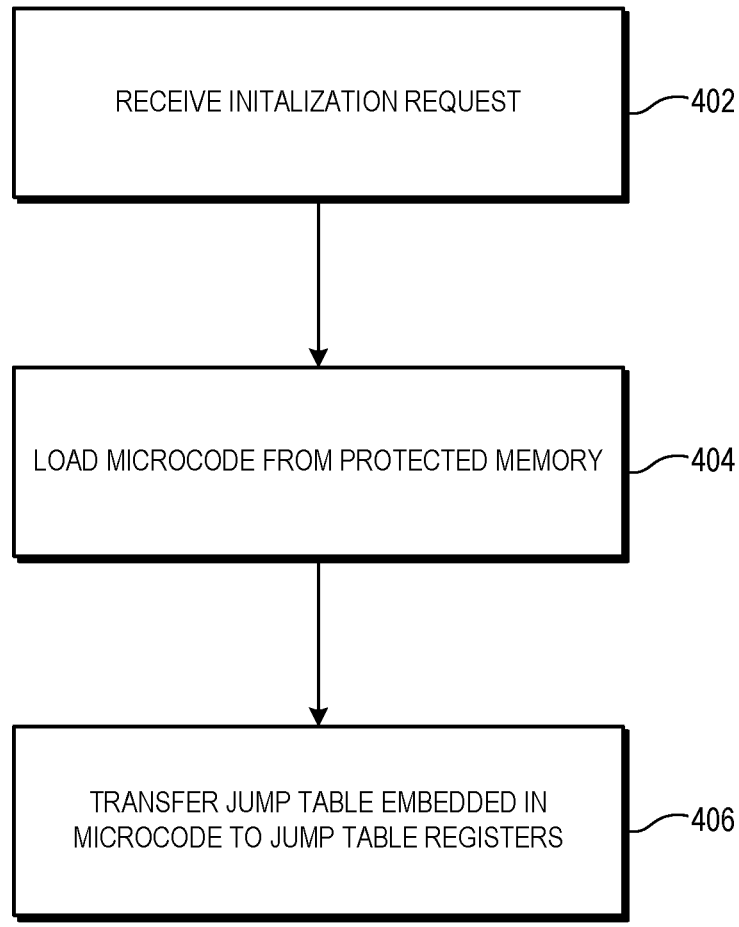
FIG. 4 is a flow diagram of a method of loading microcode with an embedded jump table to a processing unit in accordance with some embodiments.

FIG. 4 illustrates a flow diagram of a method 400 of initializing a command processor of a processing unit in accordance with some embodiments. For purposes of description, the method 400 is described with respect to an example implementation at the processor 100 of FIG. 1. At block 402, the CP 108 receives an initialization request for a program, such as an operating system or VM. At block 404, the CP 108 loads a set of microcode associated with the program from a protected region of the memory 106. At block 406, the CP 108 transfers the jump table that is embedded in the set of microcode to the jump table registers 111.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to receiving a first initialization request at a first processing unit:
loading a first set of microcode to a memory; and transferring a first jump table from the first set of microcode to a set of registers, the first jump table embedded in the first set of microcode; and processing a first set of received packets based on accessing the first jump table at the set of registers to access the first set of microcode at the memory.

2. The method of claim 1, further comprising:

in response to receiving a second initialization request at the first processing unit:

loading a second set of microcode to the memory; and transferring a second jump table from the of microcode to the set of registers, the second jump table embedded in the second set of microcode; and processing a second set of received packets based on accessing the second jump table at the set of registers to access the second set of microcode at the memory.

3. The method of claim 2, wherein the first initialization request is associated with a first virtual machine and the second initialization request is associated with a second virtual machine.

4. The method of claim 3, wherein the second initialization request is associated with a world switch from the first virtual machine to the second virtual machine.

5. The method of claim 1, wherein receiving the first initialization request comprises receiving the first initialization request from a hypervisor, and wherein transferring the first jump table comprises transferring the first jump table automatically in response to the first initialization request.

6. The method of claim 5, wherein transferring the first jump table comprises transferring the first jump table from a private memory that is inaccessible to the hypervisor.

7. The method of claim 1, wherein:

receiving the first initialization request comprises receiving the first initialization request from a second processing unit; and wherein transferring the first jump table to the set of registers comprises transferring the first jump table to the set of registers via a private bus that is inaccessible to the second processing unit.

8. The method of claim 1, wherein loading the first set of microcode to the memory comprises loading the first set of microcode from a first file, the first file compiled to embed the first jump table with the first set of microcode.

9. A method comprising:

receiving a first request at processor to execute a first virtual machine; and in response to the first request, initializing a first processing unit of the processor, the initializing comprising:

loading a first set of microcode into a memory from a first file; and transferring a first jump table from the first set of microcode to a set of registers, the first jump table embedded in the first set of microcode at the first file.

10. The method of claim 9, further comprising:

receiving a world switch request at the processor to change execution from the first virtual machine to a second virtual machine; and in response to the world switch request:

loading a second set of microcode into the memory from a second file; and transferring a second jump table from the second set of microcode to the set of registers, the second jump table embedded in the second set of microcode at the second file.

11. The method of claim 10, wherein transferring the first jump table comprises transferring the first jump table from a protected region of memory of the processor, the protected region of memory inaccessible to the second virtual machine.

12. The method of claim 11, wherein the protected region of memory is inaccessible to a hypervisor that issued the world switch request.

13. A processor comprising:

a first processing unit including a command processor configured to receive a first initialization request, the first processing unit comprising:

a memory, the first processing unit configured to load microcode to the memory in response to the first initialization request; and a set of registers, the first processing unit configured to transfer a first jump table from a first set of microcode to the set of registers, the first jump table embedded in the first set of microcode.

14. The processor of claim 13, wherein the st processing unit is configured to:

in response to receiving a second initialization request:

load a second set of microcode to the memory; and transfer a second jump table from the second set of microcode to the set of registers, the second jump table embedded in the second set of microcode.

15. The processor of claim 14, wherein the first initialization request is associated with a first virtual machine and the second initialization request is associated with a second virtual machine.

16. The processor of claim 15, wherein the second initialization request is associated with a world switch from the first virtual machine to the second virtual machine.

17. The processor of claim 13, wherein the processor is configured to execute a hypervisor that issues the first initialization request, and wherein the first processing unit is configured to load the first jump table automatically in response to the first initialization request.

18. The processor of claim 17, wherein the first processing unit is configured to load the first jump table from a private memory that is inaccessible to the hypervisor.

19. The processor of claim 13, further comprising:

a second processing unit configured to provide the first initialization request to the first processing unit; and wherein the first processing unit is configured to transfer the first jump table to the set of registers via a private bus that is inaccessible to the second processing unit.

20. The processor of claim 13, wherein the first processing unit is configured load the first set of microcode to the memory from a first file, the first file compiled to embed the first jump table with the first set of microcode.

* * * * *

UNITED STATES PATENT AND TRADEMARK OFFICE
CERTIFICATE OF CORRECTION

PATENT NO. : 11,144,329 B2
APPLICATION NO. : 16/427407
DATED : October 12, 2021
INVENTOR(S) : Alexander Fuad Ashkar et al.

It is certified that error appears in the above-identified patent and that said Letters Patent is hereby corrected as shown below:

In the Claims

At Column 7 Line 11, please insert --second set-- after the, and before of

At Column 8 Line 26, please replace "st" after the and before processing with "first"

Signed and Sealed this
Thirteenth Day of February, 2024

Katherine Kelly Vidal
*Director of the United States Patent and Trademark Office*